(12) United States Patent
Krubski

(10) Patent No.: US 8,721,072 B1
(45) Date of Patent: May 13, 2014

(54) VISION CORRECTION METHOD

(76) Inventor: George J Krubski, Denville, NJ (US)

(*) Notice: Subject to any disclaimer, the term of this patent is extended or adjusted under 35 U.S.C. 154(b) by 0 days.

(21) Appl. No.: 12/931,534

(22) Filed: Apr. 21, 2011

(51) Int. Cl.
*G02C 5/02* (2006.01)

(52) U.S. Cl.
CPC ............... *G02C 5/02* (2013.01); *G02C 2202/06* (2013.01)
USPC ............................. 351/124; 351/140; 351/178

(58) Field of Classification Search
CPC .............. G02C 5/00; G02C 5/02; G02C 5/04; G02C 5/045; G02C 2202/06; G02C 2202/08
USPC ........................ 351/41, 83, 86–102, 110, 124, 351/131–135, 140, 154, 178
See application file for complete search history.

(56) References Cited

U.S. PATENT DOCUMENTS

| | | | |
|---|---|---|---|
| 4,360,252 A | 11/1982 | Salomon | |
| 5,118,178 A | 6/1992 | Tuckerman | |
| 5,561,481 A | 10/1996 | Dileo | |
| 6,183,081 B1 * | 2/2001 | Ono et al. | 351/124 |
| 6,585,371 B1 | 7/2003 | Lin | |
| 6,604,823 B2 | 8/2003 | Hursey, Jr. | |

FOREIGN PATENT DOCUMENTS

DE 3914467 A1 * 11/1990 .................. 351/41

OTHER PUBLICATIONS

U.S. Appl. No. 11/161,653, filed Aug. 11, 2005, Ronald Krefman.

* cited by examiner

*Primary Examiner* — Huy K Mai
(74) *Attorney, Agent, or Firm* — Michael R. Philips

(57) ABSTRACT

A vision correction method is disclosed wherein a purchaser selects, obtains, and assembles a custom pair of over-the-counter, non-prescription reading glasses having different diopter magnification for each eye. A display of left lenses and right lenses in various diopters and lens frame components are available in a retail store. The purchaser conducts a self-test of reading ability to determine the correct lens diopter for each eye. The purchaser then assembles the selected lenses with supplied components according to the model selected.

8 Claims, 5 Drawing Sheets

VISION CORRECTION METHOD

FIELD OF THE INVENTION

The present invention relates to the field of non-prescription reading glasses, and more particularly to a method for enabling a customer to obtain non-prescription reading glasses with different magnification for each eye.

BACKGROUND OF THE INVENTION

As the population ages, most individuals develop presbyopia (far sightedness) progressively diminishing the ability to see close items clearly, e.g. difficulty in reading. Magnifying lenses in the form of reading glasses are a simple solution to presbyopia. Reading glasses are commonly available in many stores where a purchaser can determine the proper diopter (lens magnification power) by use of a self-administered eye test typically available at the reading glass sales display. Many consumers prefer using over-the-counter reading glasses rather than prescription reading glasses due to the lower cost and buying convenience. Over-the-counter reading glass lens powers are typically in the range of between 1.25-3.50.

Currently available over-the-counter reading glasses consist of a frame having the same diopter lens in place for both eyes. As is well known, prescription reading glasses can be provided to accommodate different diopters for each eye. Due to this limitation, some consumers are hesitant to purchase over-the-counter reading glasses. The method of the present invention overcomes this drawback by allowing a purchaser to choose diopters for each eye individually in over-the-counter reading glasses.

SUMMARY OF THE INVENTION

The invention method includes stocking a retail sales display with one or more embodiments of reading glasses components wherein a lens portion may be selected with a different diopter/power for each eye. The purchaser tests his or her reading ability with a eye chart available at the sales display. The eye chart is designed to determine the correct diopter for reading glass lenses. The lenses are provided with different geometry for the left eye and the right eye to avoid accidental reversal. The two selected lenses are then assembled into an eyeglass frame to result in a pair of reading glasses purchased over-the-counter with different diopter for each eye for custom results.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

The method of the present invention comprises means for a person who has presbyopia to a degree that differs from one eye to the other eye to obtain effective reading glasses without a prescription. A retail location is set up with a display of reading glass components in accordance with several embodiments shown in the accompanying drawing figures. A portion of the display is dedicated to left-partial glasses and another portion to right-partial glasses. The person stands a distance in front of an eye chart according to the instructions, the preferred distance being approximately 14 inches, and attempts to read lines of print on the eye chart using only one eye. Each line on the eye chart indicates a diopter strength. The line of print that is too small for the person to read is the diopter the person needs for correcting vision in the tested eye. The test is repeated with the other eye to determine the required diopter for each eye separately. It is most common for the lenses selected for the left eye and the right eye to be dissimilar in magnification power.

Having determined the desired diopter for each eye through the eye test described above, the person may return to the display to locate components with the diopter magnification determined, while selecting a desired style and appearance. When the components are selected, the person concludes the purchase and then assembles the components as will become apparent through the description of the drawings to follow. The result is a pair of reading glasses purchased over-the-counter, each lens having a diopter magnification appropriate for each respective eye of the user.

Figure 2:
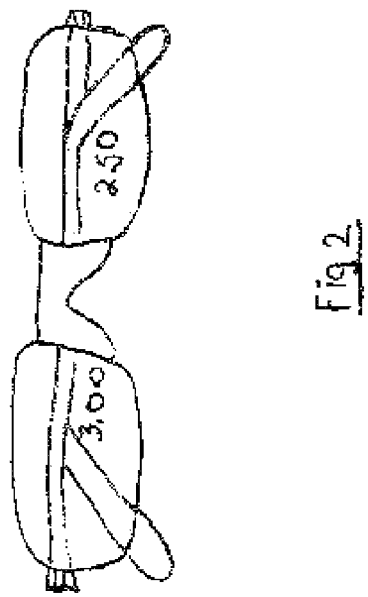
FIG. 2 is a front elevation view of the embodiment of FIG. 1 after assembly.
Figure 1:
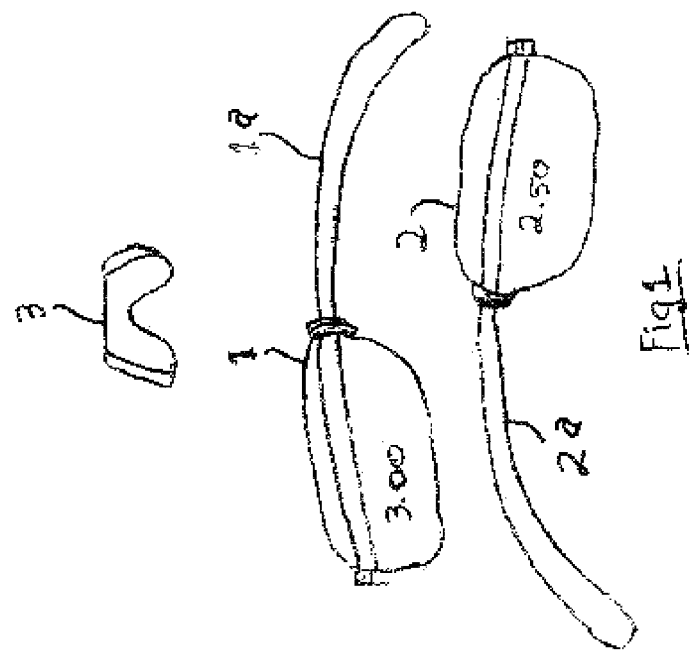
FIG. 1 is a front elevation view of a first embodiment pair of reading glasses showing a left lens connected to a left temple, a right lens connected to a right temple and a bridge, all components separated prior to assembly.

Referring to FIG. 1, three components of an over-the-counter reading glass set are shown in front elevation view. A right lens 1 is hingedly mounted to a right temple 1a. A left lens 2 is hingedly mounted to a left temple 2a. As illustrated, the purchaser has selected 3.00 diopter for the right eye and 2.50 diopter for the left eye by conducting a self-administered vision test. A bridge 3 is provided, bridge 3 being configured for assembly to right lens 1 and left lens 2. Bridge 3 may be formed with a channel in each side for snugly grasping each lens, or other means as is known. FIG. 2 illustrates the completed assembly of the eyeglasses shown in FIG. 1 as the first embodiment of the invention.

Figure 4:
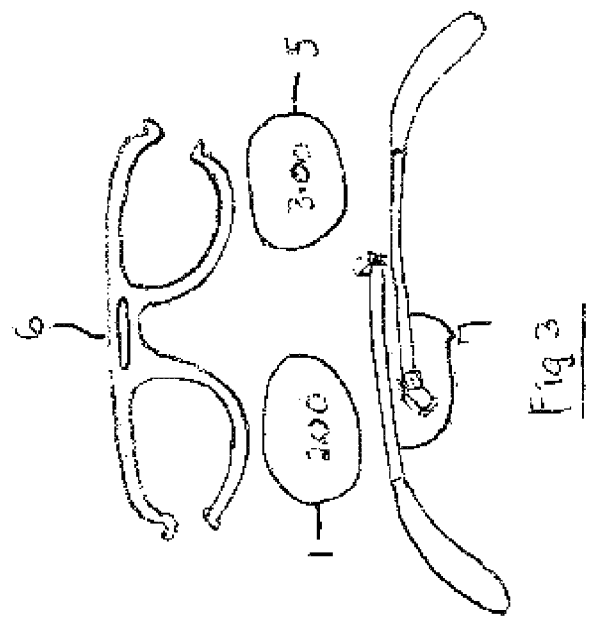
FIG. 4 is a front elevation view of the embodiment of FIG. 3 after assembly.
Figure 3:
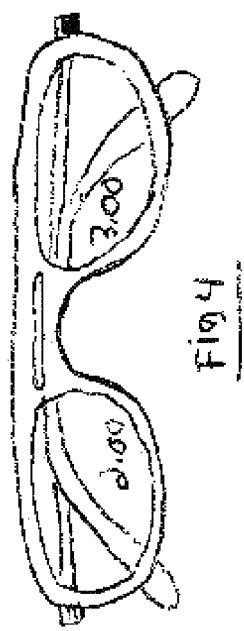
FIG. 3 is a front elevation view of a second embodiment pair of reading glasses showing a left lens, a left temple, a right lens, a right temple and a lens supporting frame including a bridge, all components separated prior to assembly.

Referring now to FIG. 3, shown in front elevation view are a right lens 4, a left lens 5, a lens frame 6 including an integrally formed bridge, and a pair of left and right temples 7. Right lens 4 is indicated to be 2.00 diopter. Left lens 5 is indicated to be 3.00 diopter. Lenses 4 and 5 are configured to nest snugly into lens-adapted openings in lens frame 6. Once lenses 4 and 5 are assembled in lens frame 6, temples 7 are assembled to the outer extremities of lens frame 6, preferably as a snap fit. FIG. 4 illustrates the completed assembly of the eyeglasses formed from the components in FIG. 3 as the second embodiment of the invention.

Figure 6:
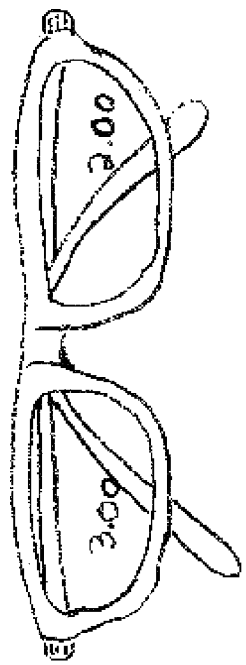
FIG. 6 is a front elevation view of the embodiment of FIG. 5 after assembly.
Figure 5:
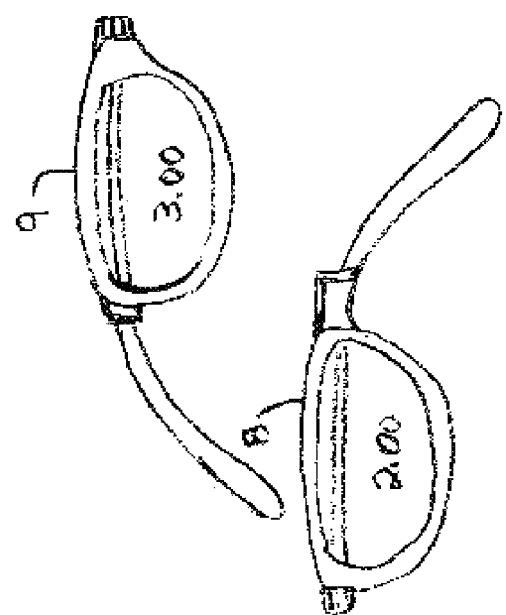
FIG. 5 is a front elevation view of a third embodiment pair of reading glasses showing a left lens held in a lens frame that is connected to a left temple, a right lens held in a right lens frame that is connected to a right temple, the right lens frame integrally molded with a bridge, both components separated prior to assembly.

Referring now to FIG. 5, a third embodiment of eyeglasses is illustrated in front elevation view of unassembled components. A right lens frame, right lens, right temple and bridge are shown, all designated by numeral 8. The right lens is indicated to be 2.00 diopter. A left lens frame, left lens, and left temple are designated by numeral 9. Left lens is indicated to be 3.00 diopter. As shown, the bridge is integrally formed with right lens frame 8. The bridge is configured to assemble by a snap fit to an extension from the center portion of left lens frame 9. FIG. 6 illustrates the completed assembly of the eyeglasses formed from the components of FIG. 5.

Figure 7:
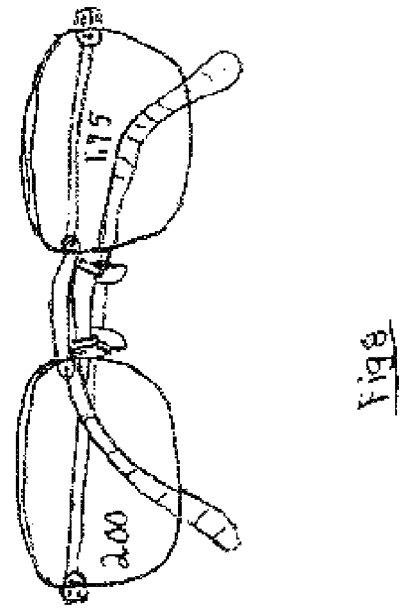
FIG. 7 is a front elevation view of a fourth embodiment pair of reading glasses showing a left lens, a left temple, a right lens, a right temple and a bridge, all components separated prior to assembly.
Figure 8:
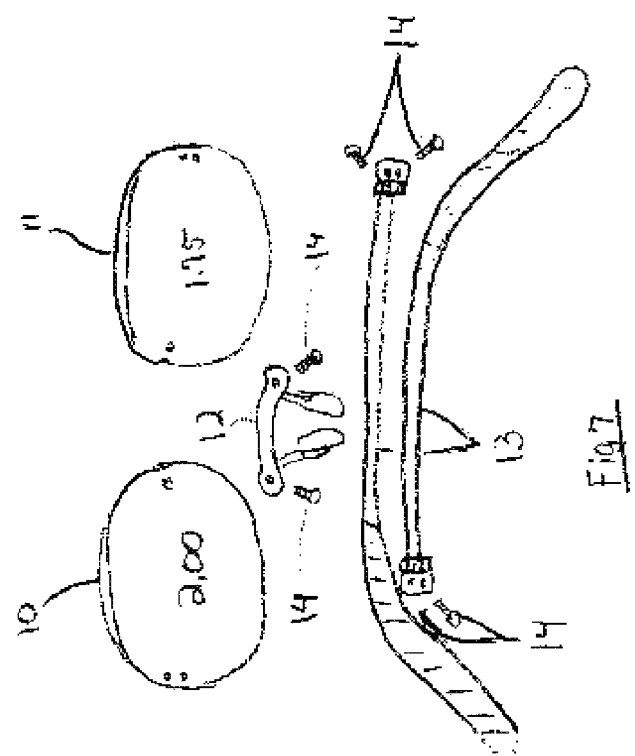
FIG. 8 is a front elevation view of the embodiment of FIG. 7 after assembly.

Referring now to FIG. 7, a set of components are shown in front elevation view according to a fourth embodiment of the invention. In this embodiment, the determination of left and right is dependent on whether the bridge 12 is mounted to the near side (as illustrated) or the far side of the lenses 10 and 11; arbitrarily, lens 10 is designated the right lens and lens 11 the left lens to conform to the descriptions of the prior figures. Right lens 10 is indicated to be 2.00 diopter, and left lens 11 is 1.75 diopter. Each lens 10, 11, is formed with holes for mounting temple hinge plates at an outer edge and a bridge at an inner edge. A bridge 12 is shown with holes for being mounted to the lenses 10, 11. A pair of fasteners 14 are provided to attach bridge 12 to lenses 10, 11, fasteners 14 being either screws or rivets. A pair of temples 13 are shown together with a further set of fasteners 14. FIG. 8 illustrates the assembled components of FIG. 7 as a pair of "rimless" reading glasses.

Figure 10:
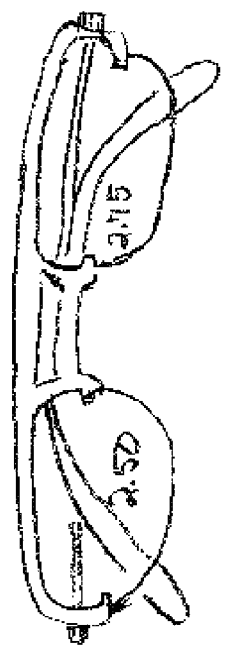
FIG. 10 is a front elevation view of the embodiment of FIG. 9 after assembly.
Figure 9:
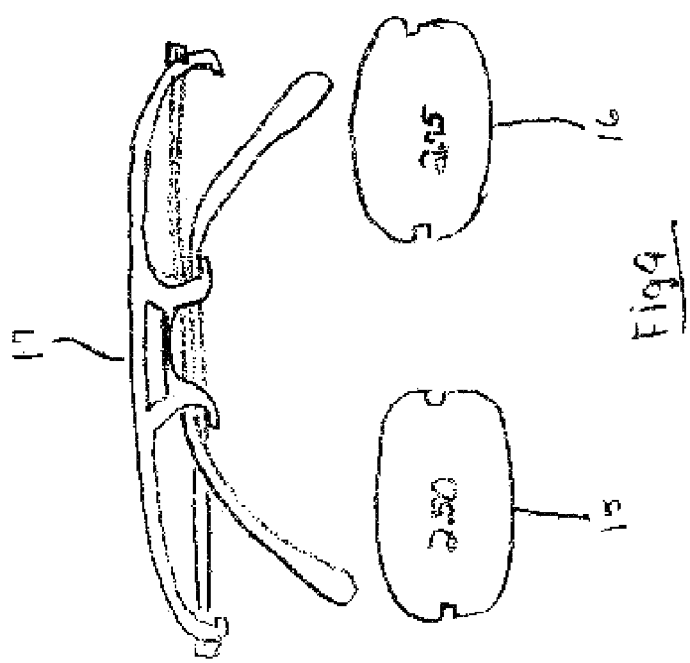
FIG. 9 is a front elevation view of a fifth embodiment pair of reading glasses showing a left lens, a right lens and a frame including lens frames, temples and a bridge, all components separated prior to assembly.

Referring now to FIG. 9, a set of components is illustrated according to a fifth embodiment of the invention. A right lens 15 is seen with a diopter of 2.50. A left lens 16 is seen with a diopter of 2.75. Lenses 15, 16 are each formed with a notch on each lateral edge thereof. A lens frame 17 with hingedly attached temples is also illustrated. Lens frame 17 is formed with an upper arc to engage the upper perimeter of each lens 15, 16, lens frame 17 having an open lower area. An inwardly directed tab is formed at the right and left extremity of each lens opening in lens frame 17, the tabs are positioned and configured for snapping into the notches in each respective lens 15, 16. FIG. 10 illustrates the assembled components of FIG. 9, providing a pair of over-the-counter half-frame reading glasses with a different diopter for each eye of the user.

As will be apparent to those skilled in the art, providing lenses having asymmetrical shape, either in the horizontal or the vertical direction, will avoid accidentally installing a right lens in the left portion of a lens frame, and vice versa.

While the description above discloses preferred embodiments of reading glass components to practice the method of the present invention, it is contemplated that numerous variations and modifications of the invention are possible and are considered to be within the scope of the claims that follow.

What is claimed is:

1. A vision correction method, comprising the steps of:
   a. providing a selection of right lenses in various diopters;
   b. providing a selection of left lenses in various diopters;
   c. providing means for testing each lens for comfortable reading by a user; and
   d. providing components for assembling a selected right lens and a selected left lens in a manner to result in a pair of reading glasses;
   e. wherein the right lens and the left lens may have different diopters.

2. The vision correction method described in claim 1, further comprising providing a selection of right lenses and left lenses in various diopters and in various styles and appearances.

3. The vision correction method described in claim 1, wherein the right lens is fixedly mounted to a right temple, the left lens is fixedly mounted to a left temple and a bridge is provided, the method comprising assembling the bridge to the right lens and the left lens.

4. The vision correction method described in claim 1, wherein the method comprises inserting a selected right lens and a selected left lens into a lens frame integrally formed with a bridge and further assembling a right temple and a left temple to the lens frame in a manner to secure the lenses in position.

5. The vision correction method described in claim 1, wherein the right lens is fixedly mounted in a right lens frame having an integral bridge and a hingedly connected right temple and the left lens is fixedly mounted in a left lens frame having means for engaging a distal edge of the bridge and a hingedly connected left temple, the method comprising assembling the right and left lens frames by connecting the means for engaging a distal edge of the bridge to the bridge.

6. The vision correction method described in claim 1, wherein the right lens and the left lens are each formed with one or more mounting holes at each lateral edge thereof and a bridge adapted for mounting to inner edges of each lens, a right temple adapted for mounting to an outer edge of the right lens and a left temple adapted for mounting to an outer edge of the left lens, whereas a pair of substantially frameless reading glasses is formed.

7. The vision correction method described in claim 1, wherein the right lens and the left lens are each formed with laterally opposed notches and the lens frame is formed with an open lower portion and laterally opposed inwardly directed tabs, the tabs being positioned and sized to engage the notches in respective lenses, the method comprising assembling the right lens and the left lens into the lens frame to form a pair of half-frame reading glasses.

8. The vision correction method described in claim 1 wherein the right lens and the left lens are formed and provided with different geometry to prevent incorrect mounting in a lens frame.

\* \* \* \* \*